United States Patent [19]

Pembroke

[11] 4,283,621

[45] Aug. 11, 1981

[54] APPARATUS AND METHOD OF STORING AND RETRIEVING INFORMATION

[76] Inventor: Robert Pembroke, 363 S. 500 East, Salt Lake City, Utah 84102

[21] Appl. No.: 103,501

[22] Filed: Dec. 14, 1979

[51] Int. Cl.³ .................. G06F 15/20; G03B 23/12; G03B 27/32; G06K 7/10
[52] U.S. Cl. .................. 235/375; 353/26 A; 355/64; 235/454
[58] Field of Search .............. 235/487, 494, 454, 462, 235/463, 419, 375; 355/64, 40, 6; 353/26 A

[56] References Cited

U.S. PATENT DOCUMENTS

| | | | |
|---|---|---|---|
| 3,259,037 | 7/1966 | Wilkinson, Jr. | 355/64 |
| 3,655,949 | 4/1972 | Rinn | 235/454 |
| 3,731,063 | 5/1973 | Bickl et al. | 235/454 |
| 3,835,297 | 9/1974 | Inoue et al. | 235/487 |
| 3,853,399 | 12/1974 | Walsh | 355/64 |
| 4,174,891 | 11/1979 | Flint et al. | 235/494 |

*Primary Examiner*—Daryl W. Cook
*Attorney, Agent, or Firm*—B. Deon Criddle; Terry M. Crellin

[57] ABSTRACT

Unique identifying symbols, such as bar codes, are preprinted on, or affixed to, each of a plurality of source documents. A scanning and recording device simultaneously reads the identifying symbol appearing on a given source document and records the image thereof on an image storage medium, such as photographic film. Also stored on the image storage medium, adjacent to each image stored thereon, is an address symbol to indicate the relative location at which a desired image is stored. Synchronization means coupled to the scanning and recording device generate an electrical data address word corresponding to this address symbol. This data address word is then combined with a similar data identifying word, generated as the scanning device reads the identifying symbol appearing on each source document, to form a data index word. The data index word is stored in a suitable data storage medium, such as magnetic tape, flexible diskettes, or the like, and is thus available for subsequent retrieval by a data processing system. Retrieval of the information thus stored is accomplished by programming a data processing system to search through the stored data index words to locate and display the address symbol of a desired source document. Once identified, the image of the desired source document is viewed by placing the image storage media, since processed and preserved, on a suitable viewing device that permits selective viewing of the image corresponding to the identified address symbol.

24 Claims, 6 Drawing Figures

APPARATUS AND METHOD OF STORING AND RETRIEVING INFORMATION

BRIEF DESCRIPTION OF THE INVENTION

1. Field of the Invention

This invention relates generally to an apparatus and method of information storage and retrieval, and more particularly to an apparatus and method for simultaneously preserving the image of a document and storing index data as to that image's storage location. The index data thus stored is of a type and format so as to be compatible with high speed data processing systems, thereby allowing an operator to quickly and efficiently locate the image of a desired document.

2. Prior Art

The prior art in the field of information storage and retrieval is extensive. The use of electronic computers and microprocessors, with their capacity for efficiently handling and storing large quantities of data, has come to be a feasible and effective way to handle large libraries of index data. The index data must first be generated and inputted into the data processing system before such large libraries can be created. Prior art storage and retrieval systems with which this inventor is familiar all use manual techniques, i.e. a keyboard to initially input such index data. U.S. Pat. No. 3,853,399 (Walsh, 1974) and the art cited therein, is representative. In these prior art systems documents are first filmed with a microfilm camera or a similar device. Index data is then manually keyed into a data processing and storage system to record the identity of and location within the microfilm, microfiche, or other image storage media, where the image of the desired document may subsequently be found. Once the images of documents are preserved, and index data is generated and stored, then the prior art also discloses a variety of techniques, both with and without the use of computers, of using this index data to retrieve, view and even copy the preserved images.

The inherent drawback of all of these prior art systems is the need to manually enter the index data ss the image of the document to be filed is captured by a camera or similar device. Manual entry of index data is not only time consuming, it may also be inaccurate. Moreover, the equipment needed to manually input data may be expensive to purchase, maintain and operate.

Also disclosed in the prior art is the use of optical scanners to "read," as it were, a line of printed text by scanning it with a beam of light and sensing the variations in the intensity of the reflected light created by the pattern of a particular character. Such systems effectively encode an entire document into a series of electrical digital signals, and thus not only preclude the need to use a camera to preserve the image thereof, but also facilitates the use of data processing techniques to both store and retrieve the information contained in the document itself, as opposed to merely storing and retrieving index data relative to where a given document or image thereof may be located. Such systems, however, are very expensive due to the complexity and capacity of the electronic circuitry required. Moreover, these systems only read printed characters, usually of a specified type style, and then only if there is the proper alignment between the optical scanner and the document being scanned. Optical scanners of this type also usually require several scans of the document in order to verify the accuracy of the reading process; thus it can be more time consuming to use these devices for the data entry function than single scan or shutter device.

Finally, the prior art reveals a simplified version of an optical scanner designed to "read" a code represented by a series of symbols, usually bars of various widths and spacings, that are printed on, or affixed to, a given object. The use of such "bar codes" is steadily increasing due to the ease with which bar codes can be read by simple scanning devices which are not alignment critical.

SUMMARY OF THE INVENTION

It is the primary object of the present invention to provide a new and useful combination of elements known to the prior art which results in a fast, efficient, and accurate information management system.

A further object of the present invention is to provide an information management system that does not require a keypunch operation during initial data entry.

A still further object of the present invention is to provide an information management system that does not require the information that is to be managed to be printed with a special typestyle, or to appear in a special format, or to be critically aligned with an imputting device during the initial data entry process.

Another object of the present invention is to provide an information management system which for all practical purposes can accommodate an unlimited volume of data in a relatively small storage area.

A further object of the present invention is to generate and store indexing data corresponding to information stored in an information management system, said indexing to be stored in media compatible with electronic data processing systems.

Still a further object of the invention herein disclosed is to provide an information management system wherein large amounts of data, and indices thereto may be transferred from one area to another with minimal cost.

The invention herein disclosed utilizes bar codes to uniquely identify each of a plurality of source documents. These bar codes, which consist of a series of heavy dark lines of various widths and spacings, may be preprinted on the source documents; or alternatively, labels on which the bar codes have been printed may be affixed to the source documents.

The source documents thus identified are then takin in any order to a device which scans the bar code and photographs the document in one operation. The scanning of the bar code generates electrical data which is routed to a data processor where it is temporarily stored as a document identifying word. A blip marking device marks an address symbol on the film at the location where the image, or photograph of the document is preserved, which address symbol indicates the relative position of the document's image relative to others on the same roll of film, i.e. first image recorded, second image recorded, . . . , fiftieth image recorded, and so on. A counting device coupled to the data processor is synchronized with the photographing process so as to track the information contained in the address symbol marked on the film by the blip marking device. This counting device is used to generate an image address word for each document that is photographed, said image address word containing information as to the precise location where that particular document's image may be found among a plurality of rolls of film.

The data processing system combines the document identifying word and the image address word to form an index word. Said index word, once generated is permanently stored in media compatible with electronic data processing systems, such as flexible diskettes, cassette tapes, punched cards, or the like. Stored in this fashion, each index word, when combined with all the other index words, comprises a complete index to the information photographed from the source documents. This complete index, stored compactly on portable media of the type compatible with data processing systems, may then be used by any suitable data processing system as the vehicle to identify the roll of film, since processed, and the relative sequential position therein, where the image of a desired source document is located. That roll of film may then be retrieved, placed on a suitable viewing device, advanced to the particular portion where the desired image is located, and energized to allow the desired image to be viewed and/or copied.

Additional objects, features and advantages of the invention will become apparent from the following detailed description and drawings, disclosing what is presently contemplated as being the best mode of the invention.

DETAILED DESCRIPTION OF THE INVENTION

Figure 1:
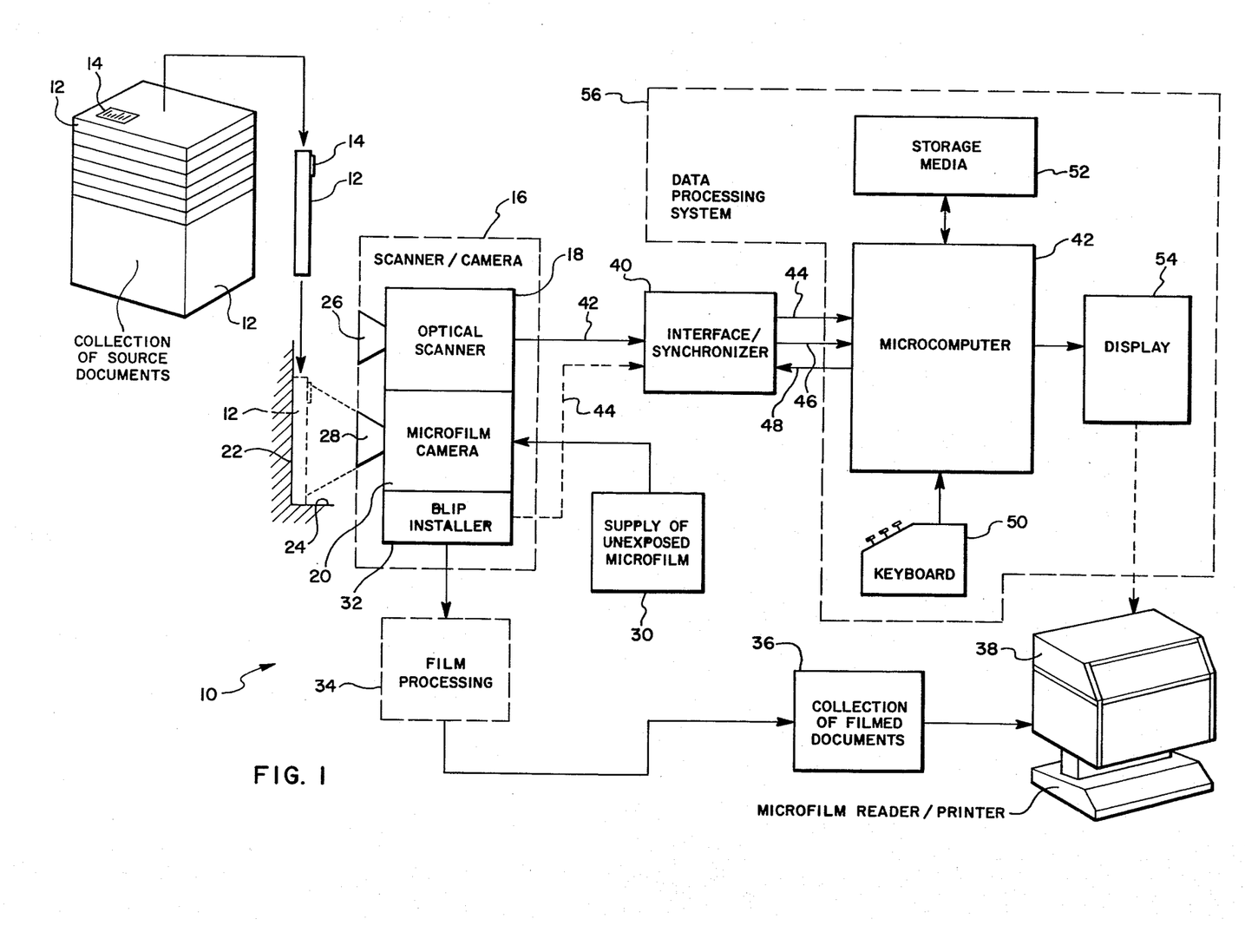
FIG. 1 is a block diagram schematic of the essential elements that comprise the system of the invention, illustrating the sequential arrangement of said elements one to another as the process included in the invention is carried out.

Referring now to the drawings:

On the preferrend embodiment of the invention shown in the block diagram of FIG. 1, there is depicted an information management system 10 designed to store and retrieve the information contained in a collection of source documents 12. Preprinted on each source document is an identifier bar code 14 shown in more detail in FIG. 2. If the bar code 14 is not preprinted on the source document 12, then a label on which a bar code has been printed may be attached to the source document 12.

Figure 2:
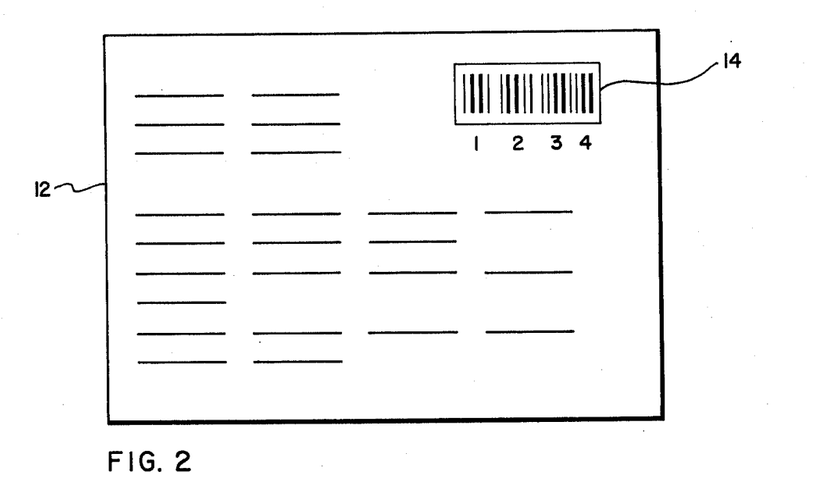
FIG. 2, a symbolic representation of a source document on which is preprinted identifying bar code information.

FIG. 2 details an example of positioning the bar code 14 on the source document 12, and also illustrates how the bar code is comprised of a series of groups of heavy bars of various widths and spacings, each group of said bars corresponding to a numeric designation.

Referring again to FIG. 1, the present invention allows source documents 12 to be brought in random order to a scanner/camera 16 where the bar code 14 is "read" by an optical scanner 18 and the source document 12 is photographed by a microfilm camera 20. As FIG. 1 symbolically shows, the optical scanner 18 and the microfilm camera 20 are physically positioned adjacent to each other so that this dual scanning/photographing process can take place within a single handling of the source document 12. That is, as the source document 12 is positioned in front of the microfilm camera 20, by sliding it along a control surface 22 until the edge of the document hits a stop plate 24, the bar code 14 is forced to pass in front of an optical head 26 of the optical scanner 18. This relative motion between the bar code 14 and the optical head 26 allows the optical scanner 18 to "read" the bar code 12, as described in the prior art, and to generate a series of electrical pulses as a function of the particular bar code 14 that was read. Once the source document 12 has thus passed in front of the optical scanner 18, it is properly positioned, as typically determined by the control surface 22 and the stop plate 24, to be photographed by the microfilm camera 20. A lens 28 of the microfilm camera 20 is selected so that at a distance and position of the source document 12 therefrom, the image of the entire document may be captured on the microfilm. A supply of microfilm 30 provides the source of the microfilm that is loaded into the microfilm camera 20. Each roll of microfilm 30 is typically at least 60 mm wide and 100 feet long, hence providing the capacity to capture a great number of images.

Figure 3:
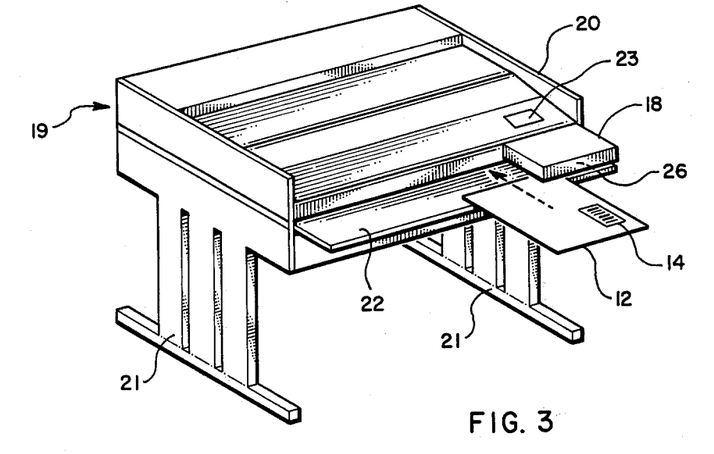
FIG. 3, a pictorial view of an exemplary device used to both optically scan and microfilm source documents.

FIG. 3 shows a perspective view of an exemplary casing 19 used to house and position the optical scanner 18 and the microfilm camera 20. As shown, the microfilm camera 20 is positioned at a suitable working height by support legs 21. A control surface 22 provides a flat horizontal surface onto which a source document 12 may be laid and slide into position in front of the lens 28 (FIG. 1) of the microfilm camera 20. The optical scanner 18 is placed above this control surface 22 so that as the document 12 is slid into position, the bar code 14 passes in front of the optical head 26, located on the underneath side of the optical scanner 18 as positioned in FIG. 3, thus allowing said optical head to "read" the information encoded on said bar code. Bar codes 14 can be "read" in this fashion even if the source document 12 is skewed, relative to the read head 26, by as much as 45 degrees. Therefore, alignment is not critical as the source document 12 is slide into position in front of the lens 28 of the microfilm camera 20, thus facilitating fast, accurate entry of source document information into the information management system 10. Cartridges or rolls of microfilm 30 are installed in conventional fashion in the microfilm camera 20 at 23.

Figure 4:
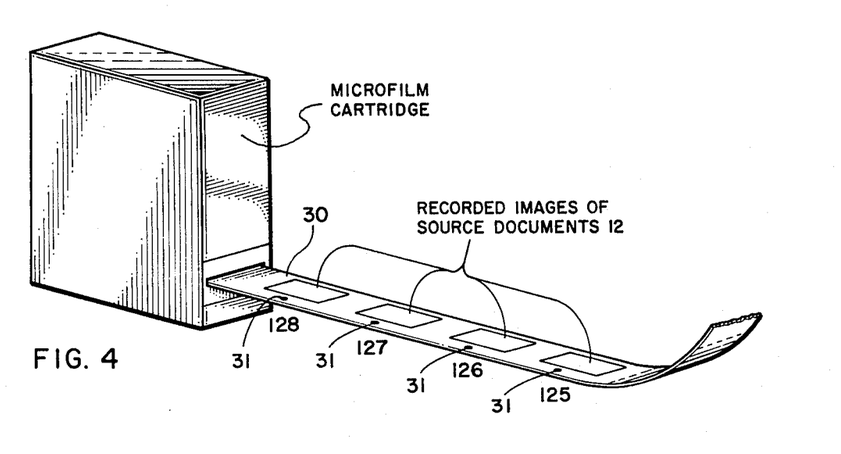
FIG. 4, a symbolic representation of a roll of microfilm, housed in a cartridge, to which sequential address symbols have been attached.

Included as an integral part of the microfilming process is a blip installing device 32. This process is best illustrated in FIGS. 1 and 4. Each time the microfilm camera 20 records an image of a source document 12, the blip installing device 32 is activated to install a standard indexing blip 31 (FIG. 4) in a standard position next to each image on the microfilm 30. This blip serves as an image of the source document 12 just filmed, i.e. first document filmed, second document and so on.

Referring again to FIG. 1, it is seen that once a roll of microfilm 30 has been filled with images of source documents 12, and has had corresponding blips or image address symbols, placed thereon, it is processed by film processing means 34. Said film processing includes developing the film to preserve the images thereon, inspecting the film, and installing the film in a suitable cartridge to facilitate the subsequent viewing thereof. Once processed in this fashion, the processed film is then placed with other similarly processed films, thereby forming a collection of filmed documents 36 which may be subsequently viewed and/or copied with the aid of a suitable microfilm reader/printer 38. The only difficulty remaining in viewing this collection of filmed documents, in order to look at a specific document, is knowing where to look, i.e. which cartridge of film should be viewed and where within that cartridge is the image of the desired document located. It is this indexing problem to which the remainder of the invention herein disclosed addresses itself.

FIG. 1 shows that the output signal from the optical scanner 18 is directed to an interface/synchronizer unit 40 over a scan signal line 42. Depending upon the type of blip installer 32 that is used in connection with the microfilm camera 20, there may also be a blip signal directed to the interface/synchronizer unit 40 over a blip signal line 44, shown in FIG. 1 as a dotted line. It is the function of the interface/synchronizer unit 40 to convert the scan signals on line 42, and the blip signal on line 44, to a form that is compatible with standard data processing techniques. More specifically, the scan signal on line 42 is converted to a document identifier word that is sent to a microcomputer 42 over signal line 44. The blip signal on line 44, if any, and/or the scan signal on line 42, are used by the interface/synchronizer unit 40 to generate an image address word which is sent to the microcomputer 42 over signal line 46. This image address word tracks, or is synchronized with, the address symbol that is installed next to the image of the document 12 which is recorded on the roll of microfilm 30 by the blip installing device 32. To aid in this synchronization process, a reset signal is sent to the interface/synchronizer unit 40 by the microcomputer 42 over a reset signal line 48. This reset signal is generated each time a new roll of microfilm 30 is installed in the microfilm camera 20, at which time the operator must enter into the microcomputer 42 through a keyboard 50, a cartridge identifier word, which word identifies the particular roll of microfilm now loaded in the microfilm camera.

Figure 6:
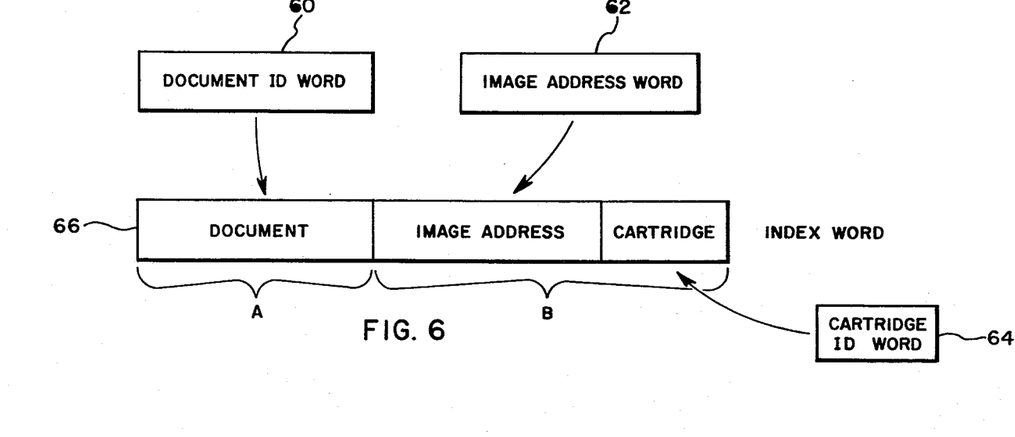
FIG. 6, exemplary formatting of the index word compiled and stored by the data processing system of FIG. 1.

The microcomputer 42 aligns the document identifier word with the image address word and the cartridge identifier word to form an index word, which index word is a composite of all three words. FIG. 6 shows an exemplary format for how this index word 66 would be formed. That is, referring to FIG. 6, it is seen that a document identifier word 60 is inserted into an index word 66 so as to constitute a first portion thereof, designated as "A." Similarly, an image address word 62 and a cartridge identifier word 64 are inserted into the index word format so as to constitute a second portion of the index word 66, designated as "B." In this fashion, a unique index word 66 is generated for each source document 12 that is filmed. The "A" portion of said index word identifies the particular source document 12 (FIG. 1) that was microfilmed based on the bar code affixed thereto. The "B" portion of said index word identifies where the image of the document identified in the "A" portion may be located—both the particular cartridge of microfilm and the relative sequential position therein.

Referring again to FIG. 1, once the microcomputer 42 generates an index word 66 (FIG. 6), this index word may be efficiently and inexpensively stored in suitable storage media 52 such as magnetic disc, magnetic tape, or the like. As each index word is stored, in this fashion, a library of indices is thus formed which may serve as the key for future retrieval of all the documents that have been microfilmed using the system of this invention. Such retrieval is accomplished by making all the index words 66 stored in the storage media 52 available to the microcomputer 42. An operator keys into the keyboard 50 sufficient information to identify the particular source document 12 that he or she wishes to view. The microcomputer 42 responds by searching through the "A" portion of all the index words until it finds the desired document. It then displays for the operator on a display terminal 54 the "B" portion of the index word, thereby informing the operator precisely where the image of the document may be found. The operator may then select the indicated cartridge or roll of microfilm, install it on a microfilm reader/printer 38, advance it to the indicated blip or address, and view or make a copy of the desired document.

As FIG. 1 shows, the microcomputer 42, with its keyboard 50, display 54, and storage media 52, actually comprise the elements of a data processing system 56. Any suitable commercially available microprocessor or minicomputer that performs the relatively simple data processing tasks required by this invention could be used by one skilled in the art to realize this function. For example, a suitable computer and software package is the Micrapoint I distributed by 3M Company.

The optical scanner 18 shown in FIG. 1 could be realized using the Intermec 9200 series of commercially available scanners, manufactured by Interface Mechanisms, Inc. Similarly, a suitable microfilm camera 20, including a built-in blip installing device 32, could be realized with a commercially available 3M "3401" microfilm camera, manufactured by 3M Company.

Figure 5:
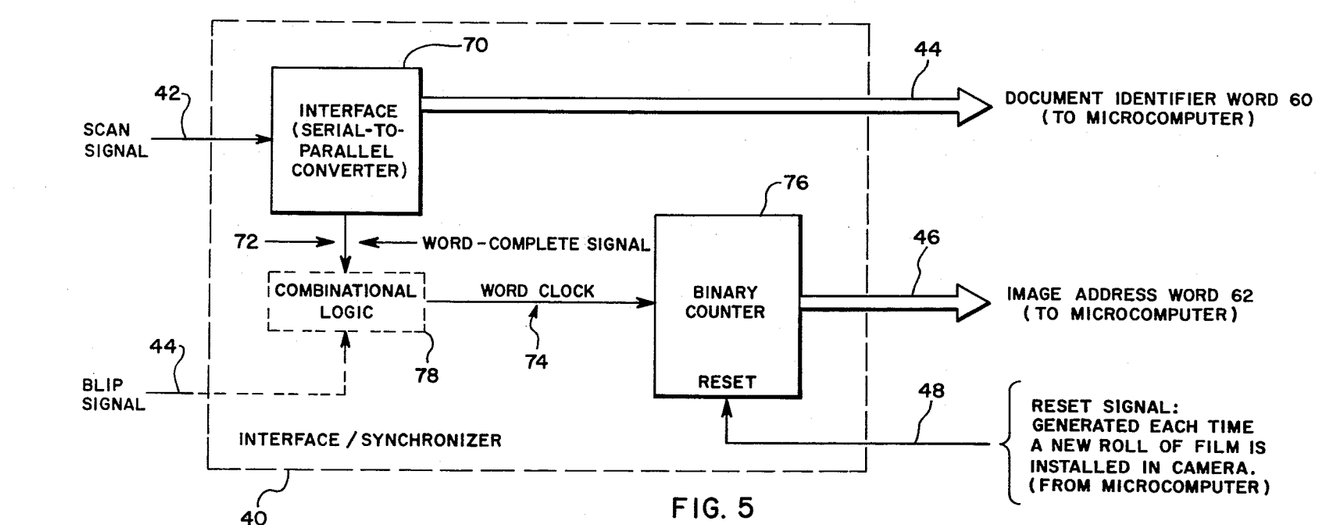
FIG. 5, a more detailed block diagram schematic of the Interface/Synchronizer block of FIG. 1.

FIG. 5 details the functional elements of an exemplary interface/synchronizer unit 40. The scan signal generated by the optical scanner 18 (FIG. 1) is sent to interface circuitry 70 over scan signal line 42. The interface circuitry 70 converts and conditions the serial pulses comprising the scan signal to a document identifier word 60, or parallel digital data. This document identifier word 60 is routed to the microcomputer over signal lines 44. Besides the conditioning function (converting the data generated by the optical scanner 18 to a form that is compatible with the design of the microcomputer 42, i.e. proper voltage and current levels), the interface circuitry 70 is primarily a serial-to parallel converter readily produced from commercially available components. The logic circuitry internal to the interface circuitry 70 includes the capability of generating a word-complete signal 72 which indiciates when the information comprising a complete document identifier word 60 has been received from the optical scanner 18. In the simplest embodiment of the interface/synchronizer unit 40, this word-complete signal 72 becomes a word clock signal 74 that is used to clock a binary counter 76. That is, each time a bar code 14 of a source document 12 is "read" by the optical scanner 18 (see FIG. 1), thereby creating one document identifier word 60, the binary counter 76 is incremented by one. Because the binary counter 76 is set to zero by a reset signal received over line 48 each time a new cartridge identifier word 64 is entered into the microcomputer 42 (each time a new roll or cartridge of microfilm is loaded in the microfilm camera), and because the blip installing device 32 installs sequential address symbols, or blips 31, on the roll of microfilm 30 beginning at zero for each new roll of film, the count information stored in the binary counter 76 tracks, or is synchronized with, said address symbol. This count information is easily converted into an image address word 62 that is routed to the microcomputer 42 over signal lines 46. As with the interface unit 70, the binary counter 76 may be easily realized by one skilled in the art using commercially available components.

Alternatively, if the particular blip installing device 32 used with the microfilm camera 20 generates a blip signal each time a blip is installed on the microfilm 30, this blip signal may be used as the word clock signal 74 which increments the binary counter 76.

A more sophisticated embodiment of the interface/synchronizer unit 40 is to employ combinational logic 78 to combine the word-complete signal 72 with the blip signal received over line 44 so that a word clock signal 74 is generated only when both signals are present. Such combinational logic, which is easily realized by one skilled in the art using commercially available components, ensures accurate tracking between the binary counter 76 and the address symbol 31. It should be noted that any signal associated with the photographing of the source documents 12 by the microfilm camera 20, such as a shutter signal, could be used in place of the blip signal for the above described purpose.

With reference to FIG. 5, it should be noted that the interface/synchronizer unit 40 may be included as part of either the commercially available optical scanner 18, or the data processing system 56, or both. For example, Interface Mechanisms, Inc. provides as part of its "Intermec 9200 Series," an optical scanner and an interface unit which, when used with a "Micrapoint I" computer/software package and a "3401" microfilm camera, both distributed by 3M Company, provides the necessary interface/synchronizing functions as above described.

It is to be understood that the above described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

I claim:

1. A system for storing and retrieving information contained in a plurality of source documents, said system comprising in combination
   identifying means of uniquely identify each of said plurality of source documents;
   scanning means for randomly reading each of said identifying means and producing a unique identifying signal as a function thereof;
   capturing means for sequentially preserving an image of each of said plurality of source documents immediately subsequent to the random reading of each of said identifying means by said scanning means;
   addressing means for annotating each of said images preserved by said capturing means with an address symbol to indicate the relative sequential position where said image is preserved within said capturing means;
   indexing means for aligning each of said unique identifying signals generated by said scanning means, which identifying signals correspond to a unique source document, with a corresponding address signal generated by said indexing means, which address signal corresponds to the address symbol annotated on the preserved image of said unique source document by said addressing means, said indexing means thus producing a unique index signal that indicates where the image of any one of said plurality of source documents is preserved within said capturing means;
   synchronization means to synchronize said indexing means with said addressing means, thereby permitting said address signal generated by said indexing means to correspond to said address symbol annotated on said preserved images by said addressing means;
   storage means for storing each of said unique index signals, thereby producing index data that can be retrieved for subsequent reference thereto;
   data viewing and sorting means for selectively retrieving and viewing said index from said storage means and sorting therethrough to locate the address of an image preserved in said capturing means corresponding to a desired source document; and
   image display means for selectively displaying one of said images preserved in said capturing means.

2. A system for storing and retrieving information as in claim 1, wherein the identifying means comprises
   unique bar codes preprinted on each of the plurality of source documents, said bar codes comprising
   a series of parallel bars of various widths, spacings, and combinations that are arranged in selected coded patterns to correspond to a desired unique alphanumeric designation.

3. A system for storing and retrieving information as in claim 1, wherein the identifying means comprises
   a plurality of labels, each preprinted with a desired bar code which may be selectively affixed to each of the plurality of source documents.

4. A system for storing and retrieving information as in claim 2 or claim 3, wherein said scanning means comprises
   an optical scanner to scan the unique bar code as the source document is slid by said optical scanner, and to produce a unique series of electrical pulses as a result of said scanning operation;
   a reading surface onto which the source documents may be placed when slid by said optical scanner;
   connecting structure to selectively position said reading surface an optimal distance from said optical scanner; and
   interface means to condition, buffer, and convert said unique series of electrical pulses from said optical scanner into an electrical digital signal that is compatible with standard data processing systems, such as a digital computer.

5. A system for storing and retrieving information as in claim 4, wherein the capturing means comprises
   a camera;
   a plurality of rolls of film, each of which may be loaded one at a time inside of said camera;
   a photographing surface onto which the source documents may be placed, said photographing surface being an extension of the reading surface connected to the optical scanner, thereby permitting a desired source document to be scanned by the optical scanner and placed on said photographing surface in the same operation;

connecting structure to selectively mount said camera an optimum distance from said photographing surface so that conventional photographing techniques may be used to record an image of the desired source document on said roll of film loaded inside of said camera as soon as the desired source document is positioned in the correct location on said photographing surface; and processing means to develop said roll of film after a series of images of desired source documents have been recorded thereon, thereby permitting said series of images to be permanently preserved and housed for subsequent viewing thereof.

6. A system for storing and retrieving information as in claim 5, wherein the camera is
a microfilm camera designed to use a roll of microfilm.

7. A system for storing and retrieving information as in claim 5, wherein the addressing means comprises
a standard blip installing device, said device being mounted inside of said camera, for installing an indexing blip or number, next to each image of the source documents is recorded on the roll of film, said indexing blip identifying the location of the image relative to the location of other images recorded on the same roll of film, i.e. first image recorded, second image recorded, and so on.

8. A system for storing and retrieving information as in claim 7, wherein the indexing means and the synchronization means comprise in combination
a digital microcomputer;
data entry means for entering a film identification word into said microcomputer that identifies which one of said plurality of rolls of film is presently loaded in said camera;
signal connection means for connecting the electrical digital signal generated by the interface means of the optical scanner to said microcomputer;
data processing means incorporated within said microcomputer to generate a document identification word for each of the electrical digital signals generated by the interface means of the optical scanner each time the unique bar code is scanned;
incrementing means incorporated within said microcomputer to generate and increment an image location word each time the electrical digital signal indicates that a source document has been scanned by said optical scanner and photographed by said camera, thereby causing said image location word to track the indexing blip;
initialization means incorporated within said microcomputer to initialize said image location word each time said film identification word is entered into said microcomputer through said data entry means, said initialization thus occurring each time a new roll of film is installed in said camera; and
cataloging means incorporated within said microcomputer to combine said document identification word, said film identification word, and said image location word, thereby creating an index word that is the composite of said three words.

9. A system for storing and retrieving information as in claim 8, wherein the storage means used with the microcomputer comprises
storage media of the type compatible with digital computers, such as floppy disk, cassette tape, and the like.

10. A system for storing and retrieving information as in claim 9, wherein the data viewing and sorting means comprises
a microcomputer that includes
a display terminal, such as a cathode ray tube (CRT);
a suitable data processing program to instruct the microcomputer to store, retrieve, sort and display the index words stored in the storage means.

11. A system for storing and retrieving information as in claim 1, wherein the image display means comprises a standard microfilm viewer.

12. A system for storing and retrieving information as in claim 11, wherein the image display means further comprises
means for copying the image as viewed by the microfilm viewer onto paper or a similar medium.

13. A system for storing and retrieving information as in claim 5, wherein the processing means to develop the roll of film comprises
microfiche equipment capable of reducing each of the recorded images and selectively placing said reduced image into a matrix of similarly reduced recorded images, thereby creating a microfiche storage element.

14. A system for storing and retrieving information contained in a plurality of source documents, said system comprising in combination
identifying means to uniquely identify each of said plurality of source documents with a unique identifying digital code;
capturing means for sequentially preserving an image of each of said plurality of source documents;
addressing means for annotating each of said images preserved by said capturing means with an address symbol to indicate the relative sequential position where said image is preserved within said capturing means;
data entry means to input said unique identifying digital codes and address symbols into said data processing and storage means;
data processing and storage means to catalog, store, and sort each of said identifying digital codes and address symbols;
data viewing and sorting means for selectively retrieving and viewing said unique identifying digital codes and address symbols from said data processing and storage means and sorting therethrough to locate the address of an image preserved in said capturing means corresponding to a desired source document; and
image display means for selectively displaying one of said images preserved in said capturing means.

15. A method for storing and retrieving information contained in a plurality of source documents comprising the steps of
identifying each of said plurality of source documents with a unique identification symbol;
scanning said unique identification symbol with a reading device designed to generate a combination of unique electrical signals corresponding to said unique identification symbol;
recording an image of each of said plurality of source documents on image storage media used in connection with a capturing device, such as a camera, at the same time, or close thereto, that said reading device scans said unique identification signal;

marking said image storage media next to each of said images recorded thereon with an address symbol to indicate the relative sequential position where said image is recorded on said image storage media;

processing and preserving said image storage media so that said images stored thereon may be subsequently retrieved and viewed in a manner such that said address symbols serve as a guide to the location of any particular image whose address symbol is known;

synchronizing an external counting device with said marking of address symbols on said image storage media so that said counting device tracks the information contained in said address symbol;

generating a unique index word by combining the information contained in said counting device with the information contained in said combination of unique electrical signals generated by said reading device, said unique index data word corresponding to the image of a particular source document;

storing said index data words on data storage media that is compatible with data processing systems, such as diskettes, cassette tapes, and the like;

searching through said index data words stored on said data storage media by using a data processing system and technique to locate the address of the image of a desired source document which is stored on said image storage media; and viewing the image whose address was identified by said data processing system and technique on a viewing device, the location of said image being found by said address symbol marked on said image storage media.

16. A method for storing and retrieving information as in claim 15, wherein the step of identifying each of the plurality of source documents with a unique identification symbol comprises affixing a bar code in each of the plurality of source documents.

17. A method for storing and retrieving information as in claim 16, wherein the step of scanning the bar code comprises mounting a commercially available optical scanner in front of a reading surface; and sliding one of the source documents along said reading surface so that the bar code passes in front of an optical read head of said optical scanner.

18. A method for storing and retrieving information as in claim 17, wherein the step of recording an image of each of the source documents comprises mounting a microfilm camera in front of an extension of said reading surface;

loading said microfilm camera with a supply of microfilm, such as a roll or cartridge of microfilm;

sliding the source document along said extension of the reading surface, after said bar code affixed thereto has passed in front of the optical scanner, until the source document is positioned in front of a lens of said microfilm camera; and opening a shutter of said microfilm camera for a sufficient length of time to properly expose a portion of said supply of microfilm, thereby recording an image of the source document on said supply of microfilm.

19. A method for storing and retrieving information as in claim 18, wherein the step of marking an address symbol next to each of the recorded images comprises using a microfilm camera that has a blip installing device mounted therein, thereby permitting said blip installing device to mark a blip, or number, next to each of the recorded images that indicates the relative sequential position where the image is recorded on the supply of microfilm.

20. A method for storing and retrieving information as in claim 19, wherein the step of synchronizing an external counting device with the address symbol marked on the supply of microfilm comprises using a reset signal, generated each time a new roll or cartridge of the supply of microfilm is loaded into the microfilm camera, to reset a counting device;

generating a clock signal to each time the optical scanner reads completely the bar code, affixed to one of the source documents; and incrementing the counting device by one count each time said clock signal is generated.

21. A method for storing and retrieving information as in claim 19, wherein the step of synchronizing an external counting device with the address symbol marked on the supply of microfilm comprises using a reset signal, generated each time a new roll or cartridge of the supply of microfilm is loaded into the microfilm camera, to reset a counting device;

generating a clock signal each time the microfilm camera records an image of one of the source documents; and incrementing the counting device by one count each time said clock signal is generated.

22. A method for storing and retrieving information as in claim 20, or claim 21, wherein the step of generating a clock signal further comprises generating a clock signal only when said optical scanner reads completely the bar code affixed to one of the source documents and the microfilm camera records an image of the source document.

23. A method for storing and retrieving information as in claim 15, wherein the step of generating a unique index data word comprises using a digital computer, and associated peripheral equipment, to generate a unique index data word by combining source document data obtained from the unique electrical signals generated by the reading device, image address data obtained from the counting device and storage media data entered manually by an operator into the digital computer.

24. A method for storing and retrieving information as in claim 15, wherein the steps of storing and searching for one of said unique index words comprises programming and using a digital computer, and associated peripheral equipment, to store, locate and display the unique index data word corresponding to a desired source document.

* * * * *

REEXAMINATION CERTIFICATE (2009th)

United States Patent [19]

Pembroke

[11] B1 4,283,621

[45] Certificate Issued May 18, 1993

[54] APPARATUS AND METHOD OF STORING AND RETRIEVING INFORMATION

[75] Inventor: Robert Pembroke, Salt Lake City, Utah

[73] Assignee: Minnesota Mining and Manufacturing Company, St. Paul, Minn.

Reexamination Request:
No. 90/002,790, Jul. 21, 1992

Reexamination Certificate for:
Patent No.: 4,283,621
Issued: Aug. 11, 1981
Appl. No.: 103,501
Filed: Dec. 14, 1979

[51] Int. Cl.$^5$ .................. G06F 15/20; G03B 23/12; G03B 27/465; G06K 7/10
[52] U.S. Cl. ........................ 235/375; 235/454; 353/26 A; 355/64

[56] References Cited

U.S. PATENT DOCUMENTS

| | | |
|---|---|---|
| 3,460,673 | 8/1969 | Sanner . |
| 3,645,619 | 2/1972 | Burton et al. . |
| 3,692,298 | 9/1972 | Peacock .................. 270/12 |
| 3,703,628 | 11/1972 | Philipson, Jr. . |
| 3,815,102 | 6/1974 | Plunkett . |
| 3,875,419 | 4/1975 | Harms, Jr. . |
| 3,988,571 | 10/1976 | Blair et al. . |
| 4,025,176 | 5/1977 | Lopata . |
| 4,027,142 | 5/1977 | Paup et al. . |
| 4,087,175 | 5/1978 | Johnson . |
| 4,110,020 | 8/1978 | Johnson et al. . |
| 4,174,890 | 11/1979 | Johnson et al. . |
| 4,198,157 | 4/1980 | Johnson . |
| 4,205,780 | 6/1980 | Burns et al. . |
| 4,251,000 | 2/1981 | Templeton . |
| 4,310,751 | 1/1982 | Martin et al. . |
| 4,324,484 | 4/1982 | Johnson . |
| 4,358,016 | 11/1982 | Richardson et al. . |
| 4,408,181 | 10/1983 | Nakayama . |
| 4,444,490 | 4/1984 | Stark et al. . |

*Primary Examiner*—John W. Shepperd

[57] ABSTRACT

Unique identifying symbols, such as bar codes, are preprinted on, or affixed to, each of a plurality of source documents. A scanning and recording device simultaneously reads the identifying symbol appearing on a given source document and records the image thereof on an image storage medium, such as photographic film. Also stored on the image storage medium, adjacent to each image stored thereon, is an address symbol to indicate the relative location at which a desired image is stored. Synchronization means coupled to the scanning and recording device generate an electrical data address word corresponding to this address symbol. This data address word is then combined with a similar data identifying word, generated as the scanning device reads the identifying symbol appearing on each source document, to form a data index word. The data index word is stored in a suitable data storage medium, such as magnetic tape, flexible diskettes, or the like, and is thus available for subsequent retrieval by a data processing system. Retrieval of the information thus stored is accomplished by programming a data processing system to search through the stored data index words to locate and display the address symbol of a desired source document. Once identified, the image of the desired source document is viewed by placing the image storage media, since processed and preserved, on a suitable viewing device that permits selective viewing of the image corresponding to the identified address symbol.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 14 and 16 are cancelled.

Claims 1, 4, 15 and 17 are determined to be patentable as amended.

Claims 5-13 and 18-24, dependent on an amended claim, are determined to be patentable.

1. A system for storing and retrieving information contained in a plurality of source documents, said system comprising in combination
   identifying means of uniquely identify each of said plurality of source documents, *the identifying means including a plurality of labels, each label preprinted with a bar code and capable of being selectively affixed to each of the plurality of source documents;*
   scanning means for randomly reading each of said identifying means and producing a unique identifying signal as a function thereof;
   capturing means for sequentially preserving an image of each of said plurality of source documents immediately subsequent to the random reading of each of said identifying means by said scanning means;
   addressing means for annotating each of said images preserved by said capturing means with an address symbol to indicate the relative sequential position where said image is preserved within said capturing means;
   indexing means for aligning each of said unique identifying signals generated by said scanning means, which identifying signals correspond to a unique source document, with a corresponding address signal generated by said indexing means, which address signal corresponds to the address symbol annotated on the preserved image of said unique source document by said addressing means, said indexing means thus producing a unique index signal that indicates where the image of any one of said plurality of source documents is preserved within said capturing means;
   synchronization means to synchronize said indexing means with said addressing means, thereby permitting said address signal generated by said indexing means to correspond to said address symbol annotated on said preserved images by said addressing means;
   storage means for storing each of said unique index signals, thereby *automatically* producing index data that can be retrieved for subsequent reference thereto;
   data viewing and sorting means for selectively retrieving and viewing said index from said storage means and sorting therethrough to locate the address of an image preserved in said capturing means corresponding to a desired source document; and
   image display means for selectively displaying one of said images preserved in said capturing means.

4. A system for storing and retrieving information as in claim [2 or claim 3,] *1* wherein said scanning means comprises
   an optical scanner to scan the unique bar code as the source document is slid by said optical scanner, and to produce a unique series of electrical pulses as a result of said scanning operation;
   a reading surface onto which the source documents may be placed when slid by said optical scanner;
   connecting structure to selectively position said reading surface an optimal distance from said optical scanner; and
   interface means to condition, buffer, and convert said unique series of electrical pulses from said optical scanner into an electrical digital signal that is compatible with standard data processing systems, such as a digital computer.

15. A method for storing and retrieving information contained in a plurality of source documents comprising the steps of
   identifying each of said plurality of source documents with a unique identification symbol *by selectively affixing one of a plurality of preprinted bar code labels to the source documents;*
   scanning said unique identification symbol with a reading device designed to generate a combination of unique electrical signals corresponding to said unique identification symbol;
   recording an image of each of said plurality of source documents on image storage media used in connection with a capturing device, such as a camera, at the same time, or close thereto, that said reading device scans said unique identification signal;
   marking said image storage media next to each of said images recorded thereon with an address symbol to indicate the relative sequential position where said image is recorded on said image storage media;
   processing and preserving said image storage media so that said images stored thereon may be subsequently retrieved and viewed in a manner such that said address symbols serve as a guide to the location of any particular image whose address symbol is known;
   synchronizing an external counting device with said marking of address symbols on said image storage media so that said counting device tracks the information contained in said address symbol;
   generating a unique index word by combining the information contained in said counting device with the information contained in said combination of unique electrical signals generated by said reading device, said unique index data word corresponding to the image of a particular source document;
   storing said index data words on data storage media that is compatible with data processing systems, such as diskettes, cassette tapes, and the like, *to automatically produce index data that can be retrieved for subsequent reference;*
   searching through said index data words stored on said data storage media by using a data processing system and technique to locate the address of the image of a desired source document which is stored on said image storage media; and viewing the image whose address was identified by said data processing system and technique on a viewing device, the location of said image being found by said address symbol marked on said image storage media.

17. A method for storing and retrieving information as in claim [16,] *15* wherein the step of scanning the bar code comprises mounting a commercially available optical scanner in front of a reading surface; and sliding one of the source documents along said reading surface so that the bar code passes in front of an optical read head of said optical scanner.

* * * * *